United States Patent [19]
Wakefield

[11] 3,840,803
[45] Oct. 8, 1974

[54] APPARATUS FOR LOCATING A HIGH RESISTANCE INSULATION FAULT IN A METALLIC COVERED CABLE

[75] Inventor: Frederick W. Wakefield, Winter Harbor, Maine

[73] Assignee: United States Steel Corporation, Pittsburgh, Pa.

[22] Filed: July 13, 1973

[21] Appl. No.: 379,039

Related U.S. Application Data

[63] Continuation of Ser. No. 220,652, Jan. 25, 1972, abandoned.

[52] U.S. Cl. .................................. 324/54, 324/52
[51] Int. Cl. ... G01r 31/12, G01r 31/02, G01r 31/08
[58] Field of Search ............................. 324/52, 54

[56] References Cited
UNITED STATES PATENTS
| | | | |
|---|---|---|---|
| 754,402 | 3/1904 | Wiseman | 324/52 |
| 2,460,688 | 2/1949 | Gambrill et al. | 324/52 |
| 2,832,042 | 4/1958 | Lambert | 324/54 X |
| 3,096,478 | 7/1963 | Brown | 324/54 |
| 3,156,863 | 11/1964 | Wakefield | 324/54 |
| 3,277,365 | 10/1966 | Doran | 324/54 |

Primary Examiner—Gerard R. Strecker
Attorney, Agent, or Firm—Rea C. Helm

[57] ABSTRACT

Detection of the location of a high resistance conductor to armor fault in a metallic armored electrical cable. The cable is passed over spaced apart electrical contacts providing a direct current flow through the cable armor between the contacts. A null detector detects the presence of a small direct current flowing in a circuit from a third armor contact spaced midway between the first two contacts, a portion of the armor, the fault, a portion of the conductor, a null detector and back to the third contact. When the fault passes the third contact, the small direct current becomes zero thus accurately locating the fault.

5 Claims, 1 Drawing Figure

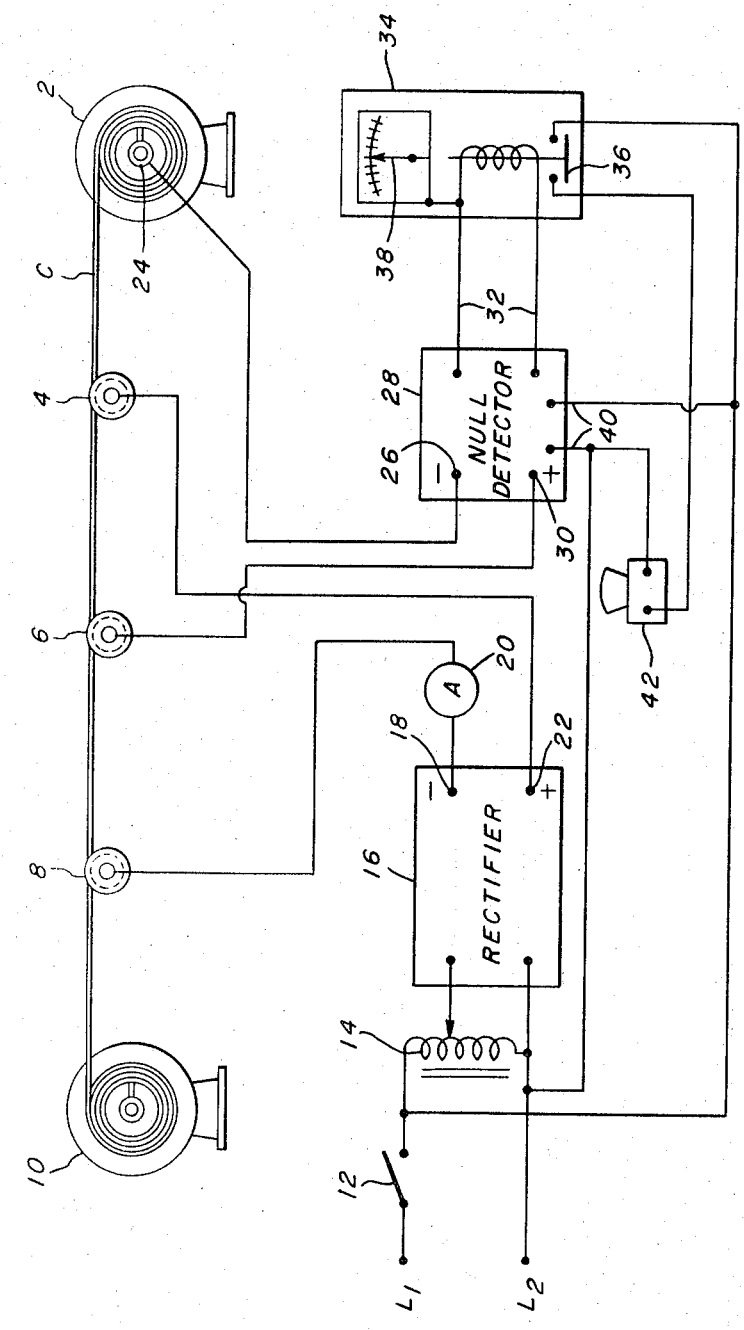

APPARATUS FOR LOCATING A HIGH RESISTANCE INSULATION FAULT IN A METALLIC COVERED CABLE

This is a continuation, of application Ser. No. 220,652, filed Jan. 25, 1972, now abandoned.

This invention relates to apparatus for locating an insulation fault in an electrical cable and more particularly to a fault location apparatus for automatically locating the exact position of a high resistance fault between the conductor and armor of a metallic armored electrical cable as the cable is wound from one reel to another.

Faults in electrical armored cable between an insulated conductor and metallic armor are usually determined approximately by using a bridge or radar type detector instrument which will indicate the position of the fault within one percent of the cable length. Since this accuracy is not sufficient for fault location in long cables, as for example 20,000 feet long, a second and more accurate detection is also necessary, such as a slide wire method, to pinpoint the fault within several inches. The necessity of using two methods requires a considerable amount of time, expensive equipment and the services of an electrical test engineer.

In accordance with my invention, the cable is passed over two spaced apart pulleys that pass a direct current through the metallic armor between the pulleys. When the high resistance fault passes between the spaced apart pulleys, a small direct current will also pass between a third pulley placed about midway between the two spaced apart pulleys, the high resistance fault, the cable conductor and circuitry connected to the third pulley and the conductor for determining the magnitude and direction of the current which accurately pinpoints the fault with respect to the third pulley.

It is therefore an object of my invention to provide apparatus for locating grounded conductors with high resistance faults by unskilled personnel in single or multiconductor metallic covered electrical cables.

Another object of my invention is to provide apparatus for locating a high resistance fault in a metallic covered cable accurately and in a minimum length of time as the cable is wound from one reel to another.

These and other objects will become more apparent after referring to the following specification and attached drawing in which the single FIGURE is a schematic view of the preferred embodiment of my invention.

Referring now to the drawing, reference numeral 2 indicates a pay-off reel for supporting electrical cable C to be tested. Cable C consists of one or more insulated conductors with a metallic covering, such as armor and having a conductor grounded to the metallic armor through a high resistance fault. From pay-off reel 2 cable C passes over three spaced apart grooved metal pulleys 4, 6 and 8 to a takeup reel 10. Pulley 6 is about midway between pulleys 4 and 8. A source of alternating current power $L_1$ and $L_2$ is connected through a switch 12 to a continuously adjustable auto transformer 14. Transformer 14 is connected to a direct current rectifier 16 which has a negative output 18 connected to pulley 8 through an ammeter 20 and a positive output 22 connected to pulley 4. Rectifier 16 is a conventional rectifier with a 6 volt, 10 ampere output rating. The grounded conductor of cable C is connected through a slip ring 24 on reel 2 to a negative input 26 of a direct current null detector 28. Pulley 6 is connected to a positive input 30 of detector 28. Detector 28 has an output 32 connected to a meter relay 34. Meter relay 34 has relay contacts 36 which are operated by the position of a meter pointer 38 of meter relay 34. Detector 28 has a power input 40 connected to $L_1$ and $L_2$ through switch 12. A horn 42 is connected to $L_1$ and $L_2$ through switch 12 and relay contacts 36. When the meter pointer 38 reaches an adjustable set point, relay 36 will close. Meter relay 34 may be an 0.5 volt direct current meter relay manufactured by the Assembly Products Company of Chesterfield, Ohio. Detector 28 may be a Model 9834 Null Detector manufactured by Leeds and Northrup Company, Philadelphia, Pa., and having an input resistance of 40,000 ohms, a maximum sensitivity of 0.2 microvolts per millimeter of meter deflection and an output voltage of from −0.5 volts to +0.5 volts for full scale deflection.

In operation, switch 12 is closed and cable C is unwound from reel 2 over pulleys 4, 6 and 8 to reel 10. Transformer 14 is adjusted so that the direct current flowing through the metallic armor between pulleys 4 and 8 is between about 5 to 10 amperes. This will create a voltage drop in the armor of cable C because of the current flowing in armor C, about one half of the voltage drop will be between pulleys 4 and 6. Assuming that the high resistance fault between the conductor and the armor is located in the cable wound on pay-off reel 2 and the end of the grounded conductor is connected to null detector 28 through slip ring 24, the voltage drop between pulleys 4 and 6 will cause a direct current to flow from pulley 6 to terminal 30 of detector 28, through the internal 40,000 input resistance of detector 28, terminal 26 of detector 28, through slip ring 24, through the conductor to the fault location, through the fault itself and finally the cable armor back to pulley 6. The direct current voltage developed across the null detector input will cause the meter relay pointer 38 to read counterclockwise. The reading can be adjusted near full scale by adjustments of the null detector sensitivity or the setting of the adjustable transformer 14. Meter relay pointer 38 has a set point on the right-hand side of the scale.

The cable is now wound on take-up reel 10 until the fault location reaches pulley 6. After the cable fault passes pulley 6, the voltage between slip ring 24 and pulley 6 will reverse polarity causing the meter relay pointer 38 to read clockwise and contact the meter set point, closing contacts 36 and causing horn 42 to sound signaling the cable ground has passed pulley 6. The cable may be wound back on pay-off reel 2 until meter 34 reads zero and the fault will then be located directly over pulley 6.

For a typical half-inch double-steel armored seven conductor cable 20,000 feet long, the voltage developed across null detector 28 would be about 5 millivolts with 5 amperes flowing between pulleys 4 and 8. The null detector may be used in the millivolt range. If the resistance of the fault was about 1 megohm, the fault could be located because the meter would read about 5 microvolts with 10 amperes in the cable armor. The high sensitivity of the null detector 28 aids in accurately locating the fault because moving the fault away from pulley 6 causes a deflection of the pointer 38. With a more sensitive null detector, this deflection becomes larger. A more accurate location of the fault is also possible by increasing the direct current through the cable armor.

While the preferred embodiment of my invention has been shown with three pulleys 4, 6 and 8, it could also operate with two pulleys, such as 4 and 6. In this case the rectifier is connected to pulley 6 instead of pulley 8 and no current is detected at all after the fault has passed pulley 6. My invention is intended to broadly include the detection of a change in a very small direct current flowing through the cable armor, fault and conductor where the current is caused to flow by a voltage drop along a section of the cable armor.

I claim:

1. Apparatus for locating a high resistance conductor to metallic covering fault in a metallic covered electrical cable comprising a pair of spaced apart electrical contacts, means for passing the cable over said contacts, a source of direct current power connected to said contacts for passing a direct current through the metallic covering between said contacts thereby creating a voltage drop between said contacts, circuit means connected to one end of the conductor and the metallic covering for passing a small direct current responsive to said voltage drop through a portion of the metallic covering, a portion of the conductor and the fault when the fault is located between the connection of said circuit means to the metallic covering and said one conductor end, and means for detecting the presence of said small direct current.

2. Apparatus according to claim 1 in which said pair of spaced apart electrical contacts are a pair of grooved pulleys over which the cable passes and said circuit means includes a third grooved pulley over which the cable passes thereby providing the connection to the metallic covering, said third pulley being spaced generally midway between and aligned with said pair of pulleys.

3. Apparatus according to claim 1 in which said means for passing the cable over said contacts includes a pay-off reel adapted to hold the cable and said circuit means includes a null detector and a slip ring mounted on said reel and connected to said one conductor end and said null detector.

4. Apparatus according to claim 3 in which said means for detecting the presence of said small direct current includes a meter relay connected to said null detector, an alternating current power source, a pair of relay contacts in said meter relay actuated by the presence of said small direct current passing through said null detector and an audible alarm connected to said alternating current power source and said relay contacts.

5. Apparatus according to claim 4 in which said pair of spaced apart electrical contacts are a pair of grooved pulleys over which the cable passes and said circuit means includes a third grooved pulley over which the cable passes thereby providing the connection to the metallic covering, said third pulley being spaced generally midway between and aligned with said pair of pulleys.

* * * * *